Patented Jan. 21, 1941

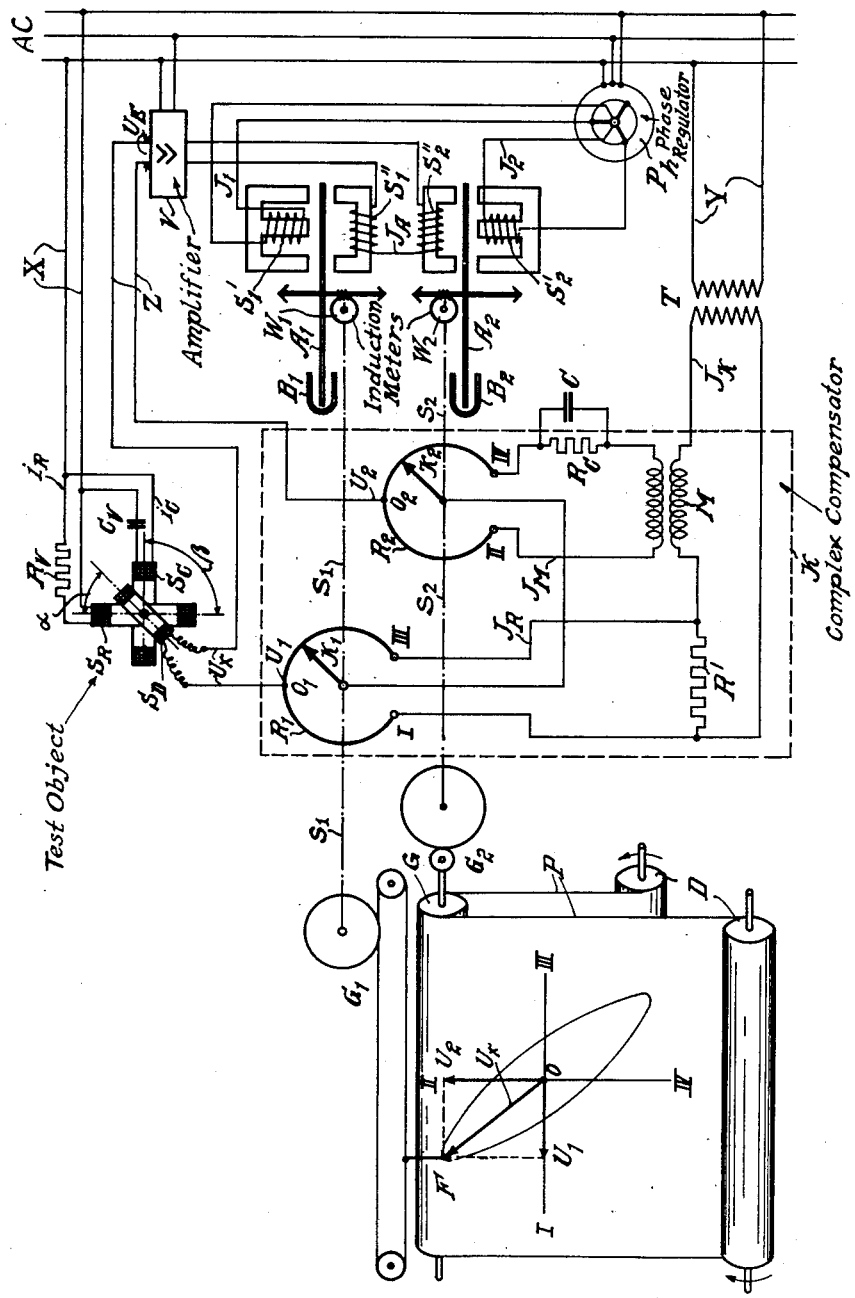

2,229,069

UNITED STATES PATENT OFFICE 2,229,069

RECORDING ELECTRIC METER

Wilhelm Geyger, Berlin-Schmargendorf, Germany, assignor to "Fides" Gesellschaft für die Verwaltung und Verwertung von gewerblichen Schutzrechten mit beschränkter Haftung, Berlin, Germany, a corporation of Germany Application July 20, 1938, Serial No. 220,324
In Germany July 23, 1937

7 Claims. (Cl. 171—34)

This invention relates to improvements in recording electric meters.

The idea of portraying an alternating current as a vector, in order to directly indicate the amplitude and phase position of the current to be analyzed as well as its effective and wattless components on a polar coordinate network, has given rise to suggestions of various kinds which have solved this problem partly by mechanical and partly by optical means. The so-called cross indictator instruments for metering the reactive output, as well as a known complex alternating current compensator containing such cross indicators, are based upon mechanical principles. Another known meter for measuring the reactive output, as well as a known coordinate recorder, contains two measuring mechanisms which deflect two shadow indicators or a beam of light in directions perpendicular to each other. With the latter coordinate recorder, an alternating current quantity can be portrayed as a vector and the curves so obtained can be recorded photographically.

An object of the present invention is to obviate the inconveniences attending the use of photography and permits a direct graphic recording of vectors and alternating current curves, for instance, in ink.

This is achieved, according to the invention, by providing a device for the automatic graphic recording of vectors and alternating electric current curves with an automatic complex alternating current compensator whose recording pen is mechanically coupled with one element of the compensator, and whose recording surface, traversed by the recording pen and moved preferably in a vertical direction thereto, is mechanically coupled with the other element of the compensator, so that both the pen and the recording surface follow the reversible movement of their respective compensator elements. The improved device is particularly suitable for scientific and technical measurements, especially for educational purposes, since the curves to be represented can readily be observed at the same time as the corresponding quantities fluctuate, contrary to the conditions prevailing with optical operation, while a permanent record is obtained.

The invention will be understood from the following description of the embodiment diagrammatically shown in the drawing, which exemplifies a manner in which characteristics of alternating current resistances or alternating current conductances may be obtained.

In the drawing, the elements enclosed by a broken line K form a complex compensator which includes two slide wires $R_1$ and $R_2$ having slide contacts $K_1$ and $K_2$ respectively. The slide wires $R_1$ and $R_2$ are tapped at their respective midpoints $O_1$ and $O_2$. The slide wire $R_1$ is connected to a non-inductive and non-capacitive shunt resistance $R'$ and the slide wire $R_2$ is inserted with a series resistance $R_c$ and a parallel condenser C in the secondary circuit of a mutual inductance M, so that the currents $J_R$ and $J_M$ flowing in the slide wires $R_1$ and $R_2$ are phase displaced by 90° relative to each other. The object to be tested is connected with the midpoints $O_1$ and $O_2$ of the slide wires $R_1$ and $R_2$ in series arrangement with the input side of a tube amplifier V. In the embodiment shown in the drawing, the test object is exemplified by a variometer arrangement comprising two stationary cross coils $S_R$ and $S_C$, a movable coil $S_D$, a resistor $R_V$ series connected with coil $S_R$, and a capacitor $C_V$ series connected with coil $S_C$. The test object is connected with an alternating current supply network AC through conductors X. The secondary voltage $U_x$ of the test object depends upon the angular position of coil $S_D$ as indicated by angle $\alpha$ and the angle $\beta$ between coils $S_R$ and $S_C$. Coil $S_D$ is connected with points $O_1$ and $O_2$ of the slide wires $R_1$ and $R_2$ respectively.

The measuring is effected, in a way still to be described, by comparing the alternating voltage $U_x$ with a compensating voltage U furnished by the complex compensator K. This counter-voltage U is composed of two part voltages $U_1$ and $U_2$ which art tapped at $O_1$ and $O_2$ from the slide wires $R_1$ and $R_2$ respectively, and which, due to the above-described circuit connections in compensator K, are phase displaced by 90° relatively to each other. The compensating voltage U which, more strictly, corresponds to $U=U_1^2+U_2^2$, is continuously regulatable in amplitude and phase by adjusting the slide contacts $K_1$ and $K_2$ so that the voltage $U_x$ to be tested may be compensated as to phase position and amplitude. Since the four halves I, II, III and IV of the slide wires from which the voltage U is derived correspond to the axial cross of a complex Gauss plane, potential vectors ($U_x$) can be compensated in all quadrants without the assistance of current reversing means. The phase position of the part voltages $U_1$ and $U_2$ of the compensator is determined by the test current $J_K$ which is supplied by an insulating transformer T connected to the three-phase alternating current network AC through conductors Y.

The automatic adjustment of the slide contacts $K_1$ and $K_2$ is effected by means of two reversible wattmetric instruments, each having an armature disc $A_1$ or $A_2$ exposed to the strong damping effect of a brake magnet $B_1$ or $B_2$, a voltage coil $S_1'$ or $S_2'$, and a current coil $S_1''$ and $S_2''$ respectively. Disc $A_1$ is connected with slide contact $K_1$, and disc $A_2$ with slide contact $K_2$ through transmission gears, for instance a worm and a worm wheel $W_1$ or $W_2$ actuating the rotary shaft $S_1$ or $S_2$ (indicated by a dot and dash line) of the respective slide contacts. The voltage windings $S_1'$ and $S_2'$ are connected with a rotating-field phase regulator $P_h$ which is connected to the three supply mains of the network so that the sine-shaped currents $J_1$ and $J_2$ which energize the windings $S_1'$ and $S_2'$ are phase displaced by 90° relatively to each other. The two current coils $S_1''$ and $S_2''$ are arranged in series and connected with the compensating branch (zero branch) Z of the alternating-current measuring circuit through the amplifier V, so that both current coils of the induction meters are traversed by the amplified output current $J_A$ which current is proportional to the input voltage $U_E$ of the amplifier. The directions of rotation of the two armature discs $A_1$, $A_2$ are so selected that $A_1$ moves the sliding contact $K_1$, and $A_2$ the sliding contact $K_2$ in the sense of the compensation adjustments required, the speed of rotation of $A_1$ and $A_2$ being at any time proportional to the divergence from the condition of compensation. The nearer $K_1$ or $K_2$ comes to the balance adjustment, the more slowly $A_1$ or $A_2$ rotates. Hunting of the sliding contacts $K_1$ and $K_2$ is consequently impossible. The arrangement is preferably so dimensioned that the time of adjustment of $K_1$ and $K_2$ amounts to only about 1 to 2 seconds.

The recording device proper comprises a recording pen F and a recording sheet or chart P. The chart is wound on storage rollers D and passes over an intermediate roller G. The two storage rollers D are constantly so adjusted by two driving devices such as Ferraris motors, not shown, that they tend to rotate in the direction indicated by arrows and to constantly maintain the paper chart P taut. The roller G is coupled with the shaft $S_2$ of the slide contact $K_2$, so that the chart follows the back and forth movements of the contact. The recording pen F is actuated by a mechanism $G_1$ which is coupled with the shaft $S_1$ so that the pen moves across the chart in accordance with the movements of slide contact $K_1$. While the mechanism G is shown diagrammatically, it is to be understood that the pen F may be mounted on a sliding carriage as is known in similar recording devices.

In the above-described recording arrangement, the recording surface of the chart P represents the complex Gauss plane, and the point of the pen F incorporates the tip of the vector $U_x$ to be shown and which is derived from the basic vectors $U_1$ and $U_2$. In the case of variations of the voltage $U_x$ to be measured, the pen F and the chart P move, corresponding to the variations of the components $U_1$ and $U_2$ of the compensating voltage, in directions perpendicular to each other. The self-balancing measuring arrangement then automatically maintains the condition of compensation at each instant and the recording pen traces the curve on the chart in ink.

With the example shown in the drawing, the potential $U_x$ to be measured is induced by a magnetic rotating field, produced by the fixed coils $S_R$, $S_C$ in the rotating coil $S_D$ of the variometer arrangement to be tested. The value and phase position of $U_x$ are, according to known laws, dependent upon the angles $\alpha$, $\beta$ between the coils, upon the electric phase angle between the currents $i_R$, $i_C$ producing the elliptical or circular rotating field and upon the ratio $i_R/i_C$ of these currents. Consequently, the recording pen F marks on the paper P (corresponding to the instantaneous value of $\beta$, $\gamma$ and $i_R/i_C$) an ellipse or a circle if $\alpha$ is continuously varied by rotating coil $S_D$ between 0 and 360°. As the test object $S_R$, $R_V$, $S_C$, $C_V$, $S_D$ and the compensator K are connected to a common source of alternating current, the measurement is independent of the AC voltage, that is, the recorder functions as a resistance measuring device.

What is claimed is:

1. In a self-balancing system for recording a vectorial electric current magnitude having an active and a reactive component, in combination, balancing circuit means for compensating said magnitude, said circuit means comprising two individually adjustable members for effecting a balance of the active and reactive components respectively of said magnitude, two reversible wattmetric instruments responsive to said active and reactive components respectively, each of said instruments being operatively connected with a different one of said members for automatically adjusting said member to its balancing position, a device for accommodating a record sheet, said device comprising a reversible transport mechanism connected with one of said members for imparting a motion to said sheet in correspondence with the reversible movements of said member, and a recording element movable transversely with respect to said sheet and connected with said other member so as to be moved in accordance with the reversible movements of said latter member.

2. In a self-balancing system for recording a vectorial electric current magnitude having an active and a reactive component, in combination, balancing circuit means for compensating said magnitude, said circuit means comprising two individually adjustable members for effecting a balance of the in-phase component and the quadrature component respectively of said magnitude, two separately excited wattmetric instruments, each being mechanically coupled with a different one of said members for automatically adjusting said members, a phase regulator connected with said wattmetric instruments so as to excite said instruments in 90° phase displacement relative to each other, a device for accommodating a record sheet, said device comprising a reversible transport mechanism connected with one of said members for imparting a motion to said sheet in correspondence with the reversible movements of said member, and a recording element movable transversely with respect to said sheet and connected with said other member so as to be moved in accordance with the reversible movements of said latter member.

3. In a self-balancing system for recording the active and the reactive component of a vectorial alternating current property of a test object, in combination, balancing circuit means to be connected with said test object, said circuit means comprising two individually adjustable members for effecting a balance of said active and reactive components respectively, two reversible wattmetric instruments each having a rotary armature and a current coil and a voltage coil, each of said armatures being mechanically connected with a different one of said adjustable members, said current coils being arranged in series and connected with said circuit means so as to be energized in accordance with the degree of compensation effected by said circuit means, phase-adjusting means for connecting said voltage coils with an alternating current source so as to excite said voltage coils with 90° phase displacement relative to each other, a device for accommodating a record sheet, said device comprising a reversible transport mechanism connected with one of said members for imparting a motion to said sheet in correspondence with the reversible movements of said member, and a recording element movable transversely with respect to said sheet and connected with said other member so as to be moved in accordance with the reversible movements of said latter member.

4. In a self-balancing system for recording the active and the reactive component of a vectorial alternating current property of a test object, in combination, an alternating current source to be connected with said test object, a compensating network having its input connected with said current source and its compensating zero branch connected with said test object, said network having two individually adjustable members for effecting in said zero branch a balance of said active and reactive components respectively, two reversible wattmetric instruments each having a rotary armature, a current coil and a voltage coil, each of said armatures being mechanically connected with a different one of said adjustable members, an amplifier connected with said current source and having its input side arranged in said zero branch and its output side series connected with said current coils so as to energize said current coils in accordance with the degree of compensation effected by said network, phase-adjusting means connected between said voltage coils and said current source for energizing said voltage coils with 90° phase displacement relative to each other, a device for accommodating a record sheet, said device comprising a reversible transport mechanism connected with one of said members for imparting a motion to said sheet in correspondence with the reversible movements of said member, and a recording element movable transversely with respect to said sheet and connected with said other member so as to be moved in accordance with the reversible movements of said latter member.

5. In a self-balancing system for recording the active and the reactive component of a vectorial alternating current magnitude of a test object, supply means for passing alternating current through said test object, a compensating network comprising two voltage dividers connected with said supply means so as to be traversed by currents of 90° phase displacement with respect to each other, a zero branch tapped from said dividers and connected with said test object, and two adjustable members for individually regulating said voltage dividers in order to compensate the active and reactive components respectively of said magnitude, in combination with two reversible wattmetric instruments each having a rotary armature, a current coil and a voltage coil, each of said armatures being mechanically connected with a different one of said adjustable members, said current coils being series arranged and connected with said zero branch so as to be energized in accordance with the instantaneous degree of compensation prevailing in said branch, phase-adjusting means connected between said voltage coils and said supply means for energizing said voltage coils with 90° phase displacement relative to each other, a device for accommodating a record sheet, said device comprising a reversible transport mechanism connected with one of said members for imparting a motion to said sheet in correspondence with the reversible movements of said member, and a recording element movable transversely with respect to said sheet and connected with said other member so as to be moved in accordance with the reversible movements of said latter member.

6. In a self-balancing system for recording the active and the reactive component of a vectorial alternating current magnitude of a test object, supply means for passing alternating current through said test object, a compensating network comprising two slide wires, circuit means disposed between said slide wires and said current supply means for energizing said slide wires by currents of 90° phase displacements relative to each other, and a compensating zero branch to be connected with said test object, said branch being tapped from said slide wires and including two slide contacts for individually balancing the active and reactive components respectively of said magnitude, in combination with two reversible wattmetric instruments each having a rotary armature operatively connected with a different one of said slide contacts, a current coil and a voltage coil, circuit means connecting said voltage coils with said current supply means so as to energize said voltage coils 90° phase displaced with respect to each other, an amplifier connected with said current supply means and having its input arranged in said zero branch and its output connected with said current coils to energize said current coils in accordance with the instantaneous degree of compensation effected in said zero branch, a device for accommodating a record sheet, said device comprising a reversible transport mechanism connected with one of said members for imparting a motion to said sheet in correspondence with the reversible movements of said member, and a recording element movable transversely with respect to said sheet and connected with said other member so as to be moved in accordance with the reversible movements of said latter member, whereby said element records on said sheet a vectorial diagram of said magnitude.

7. In a self-balancing system for recording the active and the reactive component of a vectorial alternating current magnitude of a test object, supply means for passing alternating current through said test object, a compensating network comprising a slide wire arrangement and an ohmic resistance in parallel connection, a second slide wire arrangement in connection with reactance means for passing through said second arrangement a current of 90° phase displacement with respect to the current in said first arrangement, a transformer having its primary winding connected with said current supply means and its secondary winding connected with said ohmic resistance and said reactance, a compensating zero branch tapped from the slide wires of said two arrangements and connected with said test object, and two electrically connected slide contacts for separately adjusting said arrangements so as to balance the active and reactive components respectively of said magnitude to be recorded, in combination with two reversible wattmetric instruments each having a rotary armature operatively connected with a different one of said slide contacts, a current coil and a voltage coil, phase-adjusting means connected between said voltage coils and said supply means for energizing said voltage coils with 90° phase displacement relative to each other, an amplifier connected with said current supply means and having its input arranged in said zero branch and its output connected with said current coils to energize said current coils in accordance with the instantaneous degree of compensation effected in said zero branch, a device for accommodating a record sheet, said device comprising a reversible transport mechanism connected with one of said members for imparting a motion to said sheet in correspondence with the reversible movements of said member, and a recording element movable transversely with respect to said sheet and connected with said other member so as to be moved in accordance with the reversible movements of said latter member, whereby said element records on said sheet a vectorial diagram of said magnitude.

WILHELM GEYGER.